United States Patent
Ding

(10) Patent No.: US 10,419,687 B2
(45) Date of Patent: Sep. 17, 2019

(54) IMAGING CONTROL METHODS AND APPARATUSES

(71) Applicant: Beijing Zhigu Rui Tuo Tech Co., Ltd, Beijing (CN)

(72) Inventor: Dayong Ding, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 107 days.

(21) Appl. No.: 15/321,481

(22) PCT Filed: Jun. 5, 2015

(86) PCT No.: PCT/CN2015/080839
§ 371 (c)(1),
(2) Date: Dec. 22, 2016

(87) PCT Pub. No.: WO2015/196916
PCT Pub. Date: Dec. 30, 2015

(65) Prior Publication Data
US 2017/0150027 A1    May 25, 2017

(30) Foreign Application Priority Data

Jun. 27, 2014    (CN) .......................... 2014 1 0301327

(51) Int. Cl.
H04N 5/225    (2006.01)
H04N 5/235    (2006.01)
H04N 5/353    (2011.01)

(52) U.S. Cl.
CPC ......... *H04N 5/2354* (2013.01); *H04N 5/2256* (2013.01); *H04N 5/2351* (2013.01); *H04N 5/3532* (2013.01)

(58) Field of Classification Search
CPC .. H04N 5/2354; H04N 5/2351; H04N 5/2256; H04N 5/3532
See application file for complete search history.

(56) References Cited

U.S. PATENT DOCUMENTS 6,633,338 B1 * 10/2003 Pelsue ................ G01N 21/8806
348/31
6,975,360 B2 * 12/2005 Slatter ................ H04N 1/02815
348/218.1
(Continued)

FOREIGN PATENT DOCUMENTS

CN    101277375 A    10/2008
CN    101828384 A    9/2010
(Continued)

OTHER PUBLICATIONS

International Search Report for PCT Application No. PCT/CN2015/080839, dated Aug. 28, 2015, 3 pages.

*Primary Examiner* — Timothy J Henn
(74) *Attorney, Agent, or Firm* — Amin, Turocy & Watson, LLP

(57) ABSTRACT

Imaging control methods and apparatuses are provided related to the field of imaging. A method comprises: in response to that an imaging apparatus is ready for reading data of a line of pixels, acquiring light source information of at least one glare source corresponding to the line of pixels, the at least one glare source being at least one of at least one light source of the imaging apparatus, causing a glare of the line of pixels when being in an ON state; and turning off at least one light source in an ON state in the at least one glare source according to the light source information. The influence of glare can be reduced, thereby improving the image quality.

22 Claims, 4 Drawing Sheets

(56) References Cited

U.S. PATENT DOCUMENTS

| | | | |
|---|---|---|---|
| 7,158,099 B1 | 1/2007 | Berube et al. | |
| 7,596,242 B2 | 9/2009 | Breed et al. | |
| 7,619,664 B2 * | 11/2009 | Pollard | H04N 1/00835 |
| | | | 348/241 |
| 7,646,422 B2 | 1/2010 | Kisacanin et al. | |
| 7,965,328 B2 | 6/2011 | Wakamori | |
| 8,011,584 B2 | 9/2011 | Powell et al. | |
| 8,483,479 B2 | 7/2013 | Kunkel et al. | |
| 8,593,566 B2 | 11/2013 | Gwak et al. | |
| 2004/0223075 A1 | 11/2004 | Furlan et al. | |
| 2006/0087582 A1 | 4/2006 | Scharenbroch et al. | |
| 2007/0280669 A1 | 12/2007 | Karim | |
| 2009/0073307 A1 | 3/2009 | Kramer et al. | |
| 2009/0296168 A1 | 12/2009 | Proudfoot et al. | |
| 2012/0229681 A1 | 9/2012 | Ansfield et al. | |
| 2015/0063690 A1 * | 3/2015 | Chiu | G06K 9/46 |
| | | | 382/165 |

FOREIGN PATENT DOCUMENTS

| | | |
|---|---|---|
| CN | 102422322 A | 4/2012 |
| CN | 104023179 A | 9/2014 |

\* cited by examiner

IMAGING CONTROL METHODS AND APPARATUSES

RELATED APPLICATION

The present application is a U.S. National Stage filing under 35 U.S.C. § 371 of international patent cooperation treaty (PCT) application No. PCT/CN2015/080839, filed Jun. 5, 2015, and entitled "IMAGING CONTROL METHODS AND APPARATUSES," which claims the benefit of priority to Chinese Patent Application No. 201410301327.2, filed on Jun. 27, 2014 which applications are hereby incorporated into the present application by reference herein in their respective entireties.

TECHNICAL FIELD

The present application relates to the field of imaging, and in particular, to imaging control methods and apparatuses.

BACKGROUND

When a common camera takes a picture of a smooth surface, a flash generally generates a strong glare, so that the picture has deteriorated quality, or even is totally unavailable. This situation is much more severe when taking a picture of an object through glass, or taking a picture of a magazine, a credential or the like having a smooth surface.

In the field of personal consumer electronics, particularly, when shooting by using a camera integrated to a mobile apparatus (for example, a mobile phone), to avoid a glare, generally the following two manners are used: 1) closing a flash; and 2) changing a shooting angle, for example, shooting obliquely.

The above first manner generally causes insufficient illumination of a picture to result in a low brightness, or causes an over-long shutter time, increasing the probability of image blurring due to shake of the camera; and the second manner sacrifices the composition of a picture, and has an undesirable shooting angle.

SUMMARY

An example, non-limiting objective of the present application is to provide an imaging control method and Apparatus, so as to reduce the influence of a glare.

According to one aspect of at least one example embodiment of the present application, an imaging control method is provided, the method comprising:

in response to that an imaging apparatus is ready for reading data of a line of pixels, acquiring light source information of at least one glare source corresponding to the line of pixels, the at least one glare source being at least one of at least one light source of the imaging apparatus, causing a glare of the line of pixels when being in an ON state; and turning off at least one light source in an ON state in the at least one glare source according to the light source information.

According to another aspect of at least one example embodiment of the present application, an imaging control Apparatus is provided, the Apparatus comprising:

an acquiring module, configured to: in response to that an imaging apparatus is ready for reading data of a line of pixels, acquire light source information of at least one glare source corresponding to the line of pixels, the at least one glare source being at least one of at least one light source of the imaging apparatus, causing a glare of the line of pixels when being in an ON state; and an executing module, configured to turn off at least one light source in an ON state in the at least one glare source according to the light source information.

In the methods and apparatuses of one or more of the embodiments of the present application, in response to that an imaging apparatus is ready for reading data of a line of pixels, light source information of at least one glare source corresponding to the line of pixels is acquired, and at least one light source in an ON state in the at least one glare source is turned off, so as to reduce the influence of the glare, thereby improving the image quality.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Example embodiments of the present application are further described in detail through accompanying drawings and embodiments. The following embodiments are used to describe the present application, but are not intended to limit the scope of the present application.

A person skilled in the art should understand that in the embodiments of the present application, serial numbers of steps do not indicate priorities of execution sequences, the execution sequences of the steps should be determined according to functions and inner logic thereof, and should not constitute a limitation to example embodiments of the present application.

Cameras configured on most existing mobile apparatuses almost all adopt electronic rolling shutters. An electronic rolling shutter-type imaging apparatus reads pixel data of an image sensor line by line when capturing image data; in other words, for the electronic rolling shutter-type imaging apparatus, pixel data of different lines is collected at different times. Based on the foregoing feature of the electronic rolling shutter-type imaging apparatus, the present application provides an imaging control method, so as to reduce the influence of glare. Definitely, a person skilled in the art should understand that the imaging control method may also be applicable to another imaging apparatus reading pixel data line by line.

Figure 1:
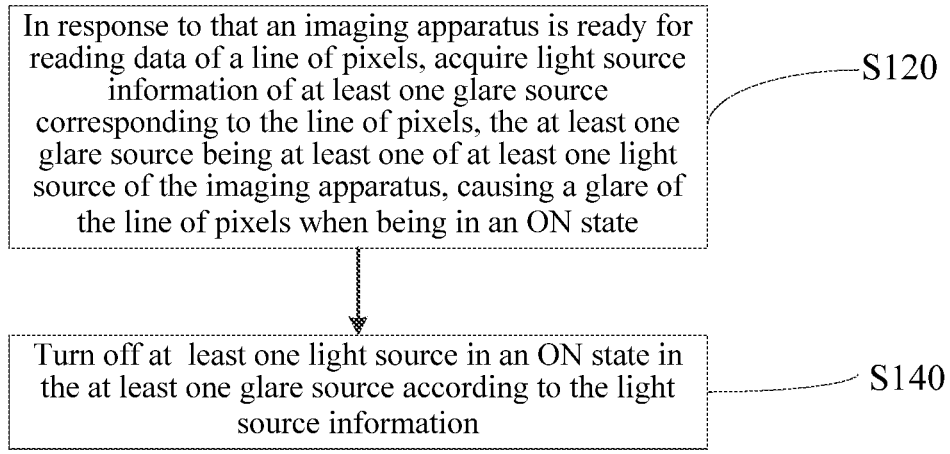
FIG. 1 is a flow chart of an imaging control method according to an example embodiment of the present application.

FIG. 1 is a flow chart of an imaging control method according to an embodiment of the present application, and the method may be implemented in, for example, an imaging control Apparatus. As shown in FIG. 1, the method comprises:

S120: In response to that an imaging apparatus is ready for reading data of a line of pixels, acquire light source information of at least one glare source corresponding to the line of pixels, the at least one glare source being at least one of at least one light source of the imaging apparatus, causing a glare of the line of pixels when being in an ON state; and S140: Turn off at least one light source in an ON state in the at least one glare source according to the light source information.

In the method of the embodiment of the present application, in response to that an imaging apparatus is ready for reading data of a line of pixels, light source information of at least one glare source corresponding to the line of pixels is acquired, and at least one light source in an ON state in the at least one glare source is turned off, so as to avoid the glare on the formed image caused by the at least one glare source.

Functions of steps S120 and S140 are described in detail through example embodiments.

S120: In response to that an imaging apparatus is ready for reading data of a line of pixels, acquire light source information of at least one glare source corresponding to the line of pixels, the at least one glare source being at least one of at least one light source of the imaging apparatus, causing a glare of the line of pixels when being in an ON state.

The imaging apparatus may be, for example, an electronic rolling shutter-type imaging apparatus, and the imaging apparatus has at least one light source (for example, a flash). If the imaging apparatus merely has one light source, in a case that the light source is turned off as a glare source, the brightness of a corresponding line of pixels is low, which affects the image quality. Therefore, in an example embodiment, the imaging apparatus has more than one light source.

As described in the foregoing, the imaging apparatus reads data of pixels line by line, and a time point of the imaging apparatus ready for reading data of a line of pixels is corresponding to a time point after the imaging apparatus reads data of an adjacent previous line of pixels and before the imaging apparatus reads the data of this line of pixels.

In an example embodiment, the acquiring light source information of at least one glare source corresponding to the line of pixels may be implemented by, for example, looking up a table, and the table records a correspondence between the line of pixels and the at least one glare source. In other words, the correspondence between the line of pixels and the corresponding glare source is predetermined. The light source information may comprise information such as a light source number of the at least one glare source.

Figure 2:
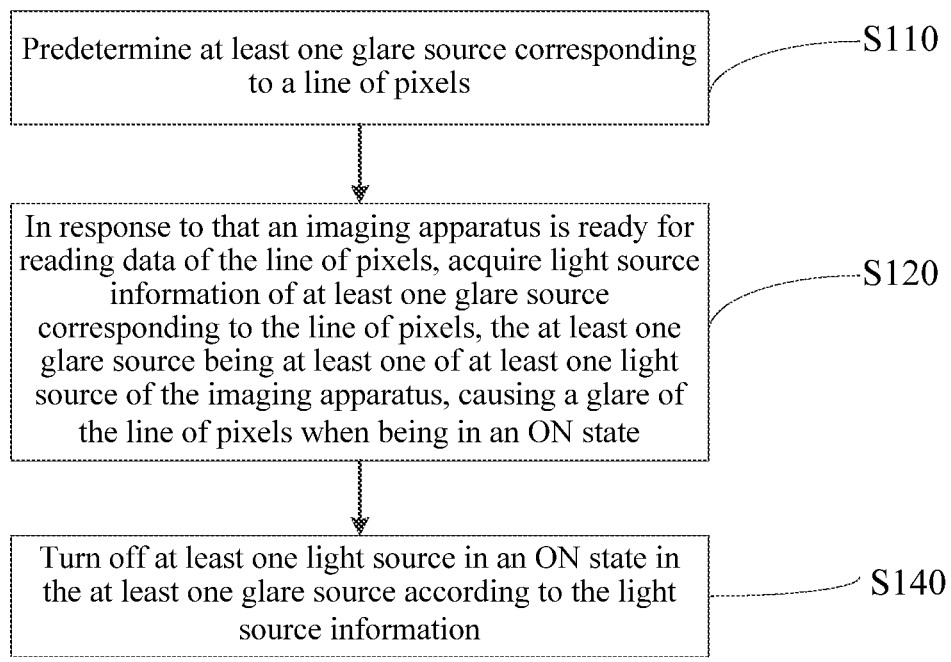
FIG. 2 is a flow chart of an imaging control method according to an example embodiment of the present application.

Referring to FIG. 2, in an example embodiment, the method further comprises:

S110: Predetermine the at least one glare source corresponding to the line of pixels.

More specifically, in order that the method can read data of each line of pixels smoothly to finally obtain a complete image, the method may predetermine at least one glare source corresponding to each line of pixels.

The "imaging" in the present application may be taking a picture, and may also be taking a video image. For taking a picture, at least one glare source corresponding to each line of pixels may be predetermined before a picture is taken. For taking a video, at least one glare source corresponding to each line of pixels may be predetermined before a video is taken, which is mainly applicable to a case in which a glare source corresponding to each line of pixels is relatively fixed. For example, when a fixed camera takes a picture of a mouse in a glass container through the glass, a major factor causing the glare is the glass instead of motion of the mouse, and the glare source corresponding to each line of pixels is generally not changed along with time; therefore, at least one glare source corresponding to each line of pixels may be predetermined before shooting, and each frame of the video image is taken according to the correspondence.

In an example embodiment, a correspondence table shown in Table 1 may be obtained. According to Table 1, it can be known that the imaging apparatus comprises three light sources A, B and C. A glare source corresponding to the 1st line of pixels is the light source A, glare sources corresponding to the 2nd line of pixels comprise the light source A and the light source B (that is, when the light source A or the light source B is turned on separately, the 2nd line of pixels will generate a glare), a glare source corresponding to the 3rd line of pixels is the light source B, and a glare source corresponding to the nth line of pixels is the light source C.

TABLE 1

| Pixel Row | Glare Source |
|---|---|
| 1 | A |
| 2 | A, B |
| 3 | B |
| . | |
| . | |
| . | |
| n | C |

In an example embodiment, the predetermining the at least one glare source corresponding to the line of pixels may specifically comprise: turning on the at least one light source respectively, and determining the at least one glare source corresponding to the line of pixels according to whether the line of pixels has a glare. By using the foregoing Table 1 as an example, the light source A may be turned on, and the light sources B and C are turned off, if the line of pixels has a glare, it is determined that the glare source corresponding to the line of pixels comprises the light source A, otherwise, the glare source corresponding to the line of pixels does not comprise the light source A; then, the light source B is turned on, and the light sources A and C are turned off, if the line of pixels has a glare, it is determined that the glare source corresponding to the line of pixels comprises the light source B, otherwise, the glare source corresponding to the line of pixels does not comprise the light source B; and finally, the light source C is turned on, and the light sources A and B are turned off, if the line of pixels has a glare, it is determined that the glare source corresponding to the line of pixels comprises the light source C, otherwise, the glare source corresponding to the line of pixels does not comprise the light source C. Similarly, a glare source corresponding to each line of pixels may be obtained.

In addition, assuming that each of two (or more) light sources are turned on, no glare is caused for the line of pixels, but when the two light sources are turned on at the same time, the line of pixels may generate a glare. Therefore, in another example embodiment, the predetermining the at least one glare source corresponding to the line of pixels may specifically comprise: turning on the at least one light source in groups respectively, and determining at least one group of the light source as the at least one glare source corresponding to the line of pixels according to whether the line of pixels has a glare. Still assuming that the imaging apparatus has three light sources A, B and C, the turning on the light sources in groups may specifically comprise: turning on the light source A, and turning off the light sources B and C; turning on the light source B, and turning off the light sources A and C; turning on the light source C, and turning off the light sources A and B; turning on the light sources A and B, and turning off the light source C; turning on the light sources A and C, and turning off the light source B; turning on the light sources B and C, and turning off the light source A; and turning on the light sources A, B and C. In other words, corresponding to each line of pixels, it is required to turn on the light sources by $(2^m-1)$ times in groups, wherein m is the number of the light sources. A finally obtained correspondence between each line of pixels and a corresponding glare source may be shown in Table 2. It may be known according to Table 2 that, a glare source corresponding to the $1^{st}$ line of pixels is the light source A, a glare source corresponding to the $2^{nd}$ line of pixels is the light source B, a glare source corresponding to the $3^{rd}$ line of pixels is at least one light source combination of the light source B and the light source C, and a glare source corresponding to the $n^{th}$ line of pixels is the light source C.

TABLE 2

| Pixel Row | Glare Source |
|---|---|
| 1 | A |
| 2 | B |
| 3 | B&C |
| . | |
| . | |
| . | |
| n | C |

In addition, it should be noted that, when predetermining the glare source corresponding to the line of pixels, generally it is unnecessary to perform turning on by $(2^m-1)$ times in groups, for example, when the light source A is a glare source of a certain line of pixels, it is unnecessary to test whether a combination of the light sources A and B, the light sources A and C, or the light sources A, B and C is a glare source of the line of pixels. This is because the light source A will be turned off before the data of the line of pixels is read, and no combination of the light source A will occur.

How to determine whether the line of pixels has a glare may specifically comprise: in response to that a proportion of glaring pixels in the line of pixels is greater than a threshold, determining that the line of pixels has a glare; otherwise, determining that the line of pixels does not have a glare. The threshold may be set according to a tolerance of a user on the glare, for example, it may be set as 1%, 10%, or the like.

In addition, in an example embodiment, the glaring pixel is a pixel whose brightness value is greater than a predetermined brightness value. For example, assuming that a change interval of a brightness value of each pixel is 0-255, the predetermined brightness value may be, for example, set as 250.

In an actual application, the glare always affects an area on an image, that is, affects multiple pixels at the same time. Therefore, to reduce an erroneous determination of glaring pixels, in another example embodiment, in addition to having the brightness value greater than the predetermined brightness value, the glaring pixel can have a predetermined number (for example, 10) of adjacent pixel whose brightness value is greater than the predetermined brightness value. The adjacent pixel may be located at a random side of the determined pixel.

S140: Turn off at least one light source in an ON state in the at least one glare source according to the light source information.

As described in the forgoing, in an example embodiment, the at least one glare source is at least one independent source, for example, the glare source corresponding to the $2^{nd}$ line of pixels in Table 1 comprises the light source A and the light source B, and in this case, light sources in an ON state in the light source A and the light source B may be turned off. Assuming that the light source A has been turned off when data of the adjacent $1^{st}$ line of pixels, it is merely required to turn off the light source B in the ON state in the light source A and the light source B in this step.

In another example embodiment, the at least one glare source is at least one group of light source, the one group of light source may comprise one light source, and may also comprise two or more light sources. For example, the glare source corresponding to the $3^{rd}$ line of pixels in Table 2 is a group of light source combination comprising the light source B and the light source C. In a case that a group of light source corresponding to a certain glare source merely comprises one light source, the light source can be turned off, as shown in the foregoing example embodiment. However, when a certain glare source is a group of light source combination comprising multiple light sources, it is unnecessary to turn off all light sources in the combination, and merely a part of the light sources in the combination can be turned off, so as to eliminate the influence of the glare. Therefore, in this example embodiment, in a case that the at least one glare source comprises a group of light source combination having multiple light sources, all light sources in an ON state in the light source combination may be turned off, and merely a part of the light sources in an ON state in the light source combination may also be turned off.

Figure 3:
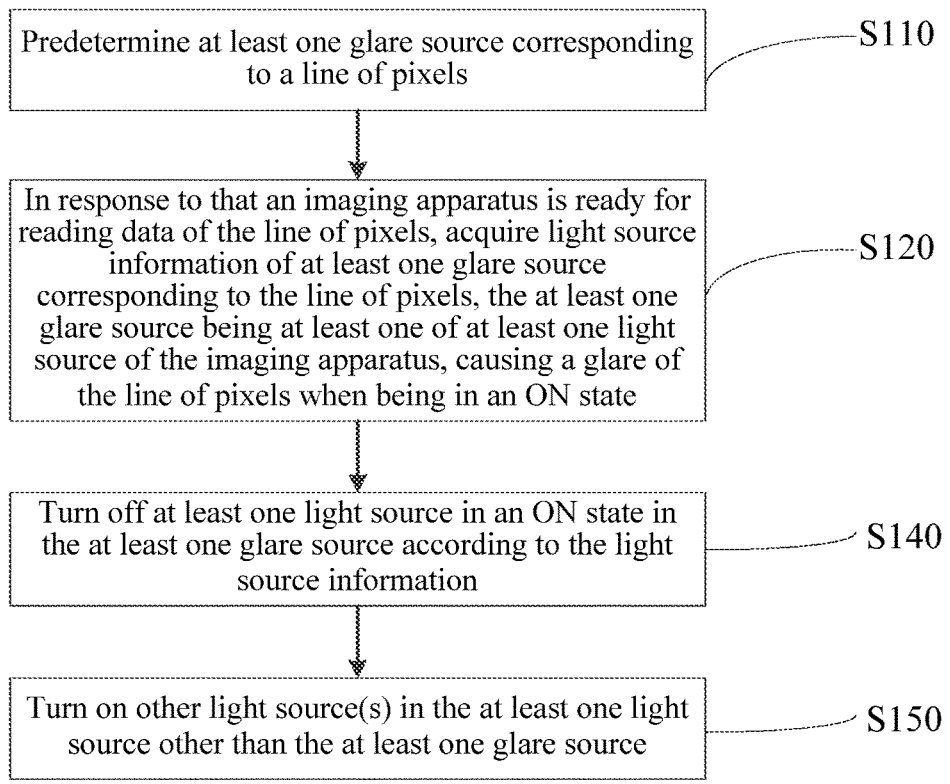
FIG. 3 is a flow chart of an imaging control method in another example embodiment of the present application.

In an example embodiment, referring to FIG. 3, the method further comprises:

S150: Turn on other light source(s) in the at least one light source other than the at least one glare source.

When data of a previous line of pixels adjacent to the line of pixels is read, some light sources may be turned off as a glare source of the adjacent previous line of pixels, however, for the line of pixels, the previously turned off light source may not be a glare source thereof; therefore, to ensure the overall brightness of a formed image, in this step, other light source(s) in the at least one light source other than the at least one glare source may be turned on. By using Table 1 as an example, when the $2^{nd}$ line of pixels is read, the light sources A and B are both turned off, and when the $3^{rd}$ line of pixels is read, it is merely required to turn off the light source B, and therefore, the light source A should be turned on, so as to ensure the overall brightness of the image.

Figure 4:
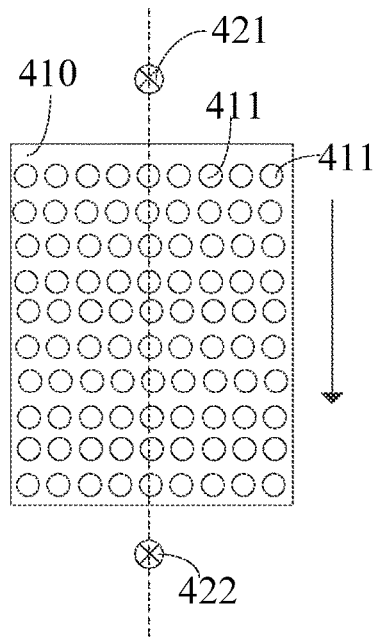
FIG. 4 is a schematic diagram of light sources distributing along a rolling direction according to an example embodiment of the present application.

In addition, to ensure the overall brightness of the image, it is unexpected that all light sources are turned off when a certain line of pixels is read, and therefore, in an example embodiment, when the imaging apparatus has at least two light sources, the at least two light sources are distributed along a rolling direction of the electronic rolling shutter-type imaging apparatus. As shown in FIG. 4, the imaging apparatus has a first light source 421 and a second light source 422, multiple lines of pixels 411 are provided on a sensor 410 of the imaging apparatus, an arrow direction indicates a rolling direction, and in a case that the first light source 421 and the second light source 422 are distributed along the rolling direction, the probability of the two light sources causing a glare to the same line of pixels is the minimum, thereby preventing the two light sources from being turned off at the same time. Definitely, a distribution direction of the at least two light sources may form an angle less than 90° with the rolling direction, or, when the number of the light sources is large (for example, more than three), the light sources may not be distributed along a direction.

In addition, an embodiment of the present application further provides a computer readable medium, comprising computer readable instructions for performing the following operations when being executed: executing operations of steps S120 and S140 in the method in the example embodiment shown in FIG. 1.

In view of the above, in the method of the present application, a glare source corresponding to each line of pixels is predetermined, and at least one light source causing the glare on the line of pixels may be turned off in advance before the line of pixels is read, thereby reducing the influence of the glare. In addition, in the method, before each line of pixels is read, other light source(s) in all light sources of the imaging apparatus other than the at least one glare source is turned on, so as to ensure the overall brightness of an image.

Figure 5:
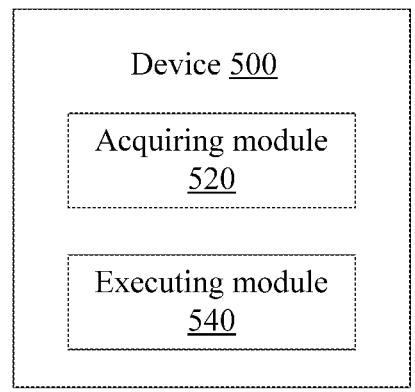
FIG. 5 is a schematic structural diagram of modules of an imaging control apparatus according to an example embodiment of the present application.

An embodiment of the present application further provides an imaging control Apparatus, and the imaging control Apparatus may be configured to be integrated to or separated from an imaging apparatus. As shown in FIG. 5, the imaging control Apparatus 500 may comprise:

an acquiring module 520, configured to: in response to that an imaging apparatus is ready for reading data of a line of pixels, acquire light source information of at least one glare source corresponding to the line of pixels, the at least one glare source being at least one of at least one light source of the imaging apparatus, causing a glare of the line of pixels when being in an ON state; and an executing module 540, configured to turn off at least one light source in an ON state in the at least one glare light source according to the light source information.

In the Apparatus of the embodiment of the present application, in response to that an imaging apparatus is ready for reading data of a line of pixels, light source information of at least one glare source corresponding to the line of pixels is acquired, and at least one light source in an ON state in the at least one glare source is turned off, so as to avoid the glare on the formed image caused by the at least one glare source.

Functions of the acquiring module 520 and the executing module 540 are described in detail through example embodiments.

The acquiring module 520 is configured to: in response to that an imaging apparatus is ready for reading data of a line of pixels, acquire light source information of at least one glare source corresponding to the line of pixels, the at least one glare source being at least one of at least one light source of the imaging apparatus, causing a glare of the line of pixels when being in an ON state.

The imaging apparatus may be, for example, an electronic rolling shutter-type imaging apparatus, and the imaging apparatus has at least one light source (for example, a flash). If the imaging apparatus merely has one light source, in a case that the light source is turned off as a glare source, the brightness of a corresponding line of pixels is low, which affects the image quality. Therefore, in an example embodiment, the imaging apparatus has more than one light source.

As described in the foregoing, the imaging apparatus reads data of pixels line by line, and a time point of the imaging apparatus ready for reading data of a line of pixels is corresponding to a time point after the imaging apparatus reads data of an adjacent previous line of pixels and before the imaging apparatus reads the data of this line of pixels.

Figure 6:
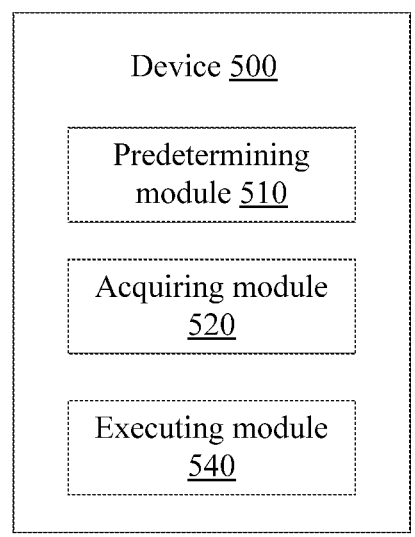
FIG. 6 is a schematic structural diagram of modules of an imaging control apparatus according to an example embodiment of the present application.

In an example embodiment, the determining module 520 acquires light source information of the at least one glare source corresponding to the line of pixels by looking up a table, wherein the table records a correspondence between the line of pixels and the at least one glare source. In other words, the correspondence between the line of pixels and the corresponding glare source may be predetermined. Referring to FIG. 6, in an example embodiment, the Apparatus 500 further comprises:

a predetermining module 510, configured to predetermine the at least one glare light source corresponding to the line of pixels.

In an example embodiment, the predetermining module 510 is configured to turn on the at least one light source respectively, and determine the at least one glare light source corresponding to the line of pixels according to whether the line of pixels has a glare.

In another example embodiment, the predetermining module 520 is configured to turn on the at least one light source in groups respectively, and determine at least one group of the light source as the at least one glare light source corresponding to the line of pixels according to whether the line of pixels has a glare.

For how to determine whether the line of pixels has a glare, in an example embodiment, the predetermining module 510 is configured to: in response to that a proportion of glaring pixels in the line of pixels is greater than a threshold, determine that the line of pixels has a glare; otherwise, determine that the line of pixels does not have a glare. The threshold may be set according to a tolerance of a user on the glare, for example, it may be set as 1%, 10%, or the like.

The glaring pixel is a pixel having a brightness value greater than a predetermined brightness value, or, in addition to having the brightness value greater than the predetermined brightness value, the glaring pixel further can have a predetermined number (for example, 10) of adjacent pixel whose brightness value is greater than the predetermined brightness value. The adjacent pixel may be located at a random side of the determined pixel.

The executing module 540 is configured to turn off at least one light source in an ON state in the at least one glare light source according to the light source information.

In an example embodiment, the at least one glare source is at least one independent source, for example, the glare source corresponding to the $2^{nd}$ line of pixels in Table 1 comprises the light source A and the light source B, and in this case, the executing module 540 may turn off the light source in an ON state in the light source A and the light source B.

In another example embodiment, the at least one glare source is at least one group of light source, the one group of light source may comprise one light source, and may also comprise two or more light sources. For example, the glare source corresponding to the $3^{rd}$ line of pixels in Table 2 is a group of light source combination comprising the light source B and the light source C. In a case that a group of light source corresponding to a certain glare source merely comprises one light source, the light source can be turned off, as shown in the foregoing example embodiment. However, when a certain glare source is a group of light source combination comprising multiple light sources, it is unnecessary to turn off all light sources in the combination, and merely at least one light source in the combination can be turned off, so as to eliminate the influence of the glare. Therefore, in this example embodiment, in a case that a certain glare source is a group of light source combination comprising multiple light sources, the executing module 540 may turn off all light sources in the light source combination, and may merely turn off a part of the light sources in the light source combination.

When data of a previous line of pixels adjacent to the line of pixels is read, some light sources may be turned off as a glare source of the adjacent previous line of pixels, however, for the line of pixels, the previously turned off light source may not be a glare source thereof; therefore, in an example embodiment, the executing module 540 is further configured to turn on the light source(s) in the at least one light source other than the at least one glare source.

In addition, to ensure the overall brightness of the image, it is unexpected that all light sources are turned off when a certain line of pixels is read, and therefore, in an example embodiment, the at least one light source is at least two light sources, and the at least two light sources are distributed along a rolling direction of the electronic rolling shutter-type imaging apparatus.

Figure 7:
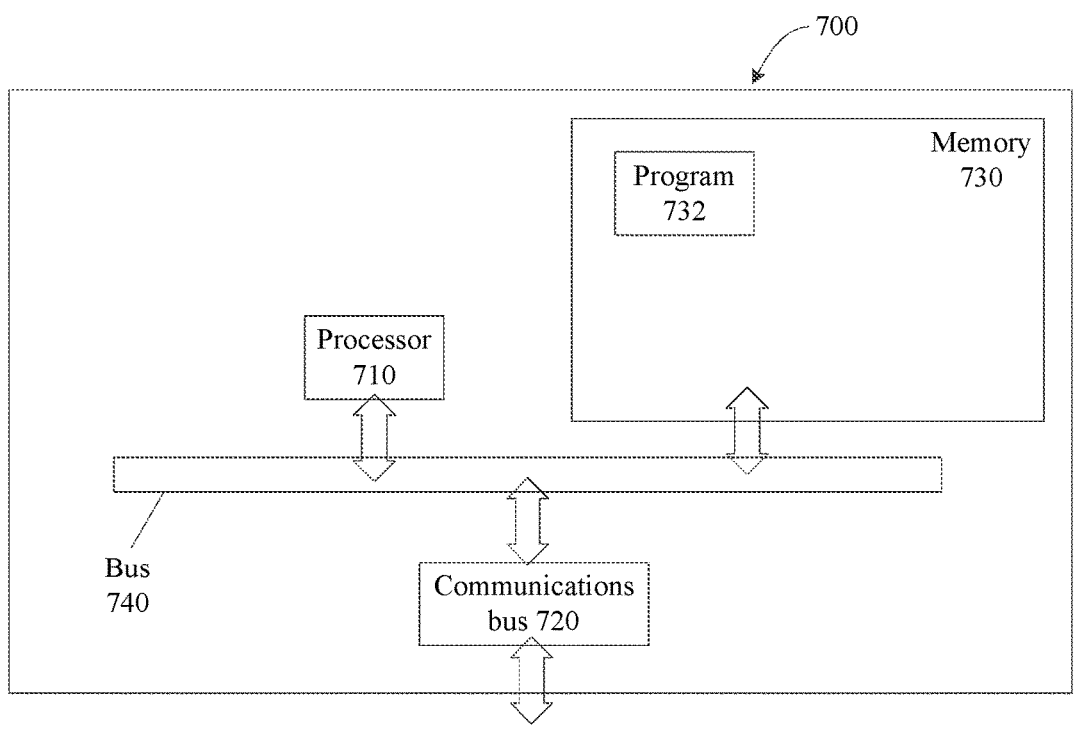
FIG. 7 is a schematic structural diagram of hardware of an imaging control apparatus according to an example embodiment of the present application.

A hardware structure of an imaging control Apparatus according to an embodiment of the present application is shown in FIG. 7. The example embodiment of the imaging control Apparatus is not limited in the specific embodiments of the present application, and referring to FIG. 7, the Apparatus 700 may comprise:

a processor 710, a communications interface 720, a memory 730, and a communications bus 740, where:

The processor 710, the communications interface 720, and the memory 730 complete mutual communications with each other through the communications bus 740.

The communications interface 720 is configured to perform communications with other network elements.

The processor 710 is configured to execute a program 732, and specifically may execute relevant steps in the method embodiment shown in FIG. 1.

Specifically, the program 732 may comprise a program code. The program code comprises a computer operating instruction.

The processor 710 may be a central processing unit CPU or an Application Specific Integrated Circuit (ASIC), or be configured to be one or more integrated circuits configured to implement the embodiments of the present application.

The memory 730 is configured to store the program 732. The memory 730 may comprise a high-speed RAM memory and may also further comprise a non-volatile memory, for example, at least one magnetic disk memory. The program 732 specifically may execute the following steps:

in response to that an imaging apparatus is ready for reading data of a line of pixels, acquiring light source information of at least one glare source corresponding to the line of pixels, the at least one glare source being at least one of at least one light source of the imaging apparatus, causing a glare of the line of pixels when being in an ON state; and turning off at least one light source in an ON state in the at least one glare source according to the light source information.

Example embodiments of all steps in the program 732 may be referred to in the corresponding steps or units in the above embodiments, and are not repeated herein. It can be clearly understood by persons skilled in the art that, for the purpose of convenient and brief description, for a detailed working process of the described apparatuses and modules, reference may be made to the corresponding process in the foregoing method embodiment, and the details will not be described herein again.

Persons of ordinary skill in the art should appreciate that, in combination with the examples described in the embodiments herein, units and method steps can be implemented by electronic hardware, or a combination of computer software and electronic hardware. Whether the functions are executed by hardware or software depends on specific applications and design constraint conditions of the technical solutions. Persons skilled in the art can use different methods to implement the described functions for every specific application, but it should not be considered that this example embodiment goes beyond the scope of the present application.

When being implemented in the form of a software functional unit and sold or used as a separate product, the functions may be stored in a computer-readable storage medium. Based on such understanding, the technical solutions of the present application essentially, or the part contributing to the prior art, or part of the technical solutions may be implemented in a form of a software product. The computer software product is stored in a storage medium, and comprises several instructions for instructing a computer Apparatus (which may be a personal computer, a controller, a network Apparatus, and the like) to execute all or part of the steps of the method described in each of the embodiments of the present application. The aforementioned storage medium comprises: any medium that can store program codes, such as a USB disk, a removable hard disk, a read-only memory (ROM), a random access memory (RAM), a magnetic disk, or an optical disc.

The aforementioned description of the example embodiments are merely provided for describing the present application, but not intended to limit the present application. Persons of ordinary skills in the art can also make many variations and changes without departing from the spirit and the scope of the present application. Therefore, all the equivalent technical solutions also fall within the scope of the present application, and the patent protection scope of the present application shall be limited by the claims.

What is claimed is:

1. A method, comprising:
    in response to determining that a proportion of glaring pixels in a line of pixels is greater than a threshold, determining that the line of pixels has a glare;
    in response to determining that an imaging device is ready for reading data of the line of pixels, acquiring, by a system comprising a processor, light source information of at least one glare source corresponding to the line of pixels, the at least one glare source being at least one light source of the imaging apparatus, causing the glare of the line of pixels when being in an ON state; and
    turning off the at least one light source in the ON state in the at least one glare source according to the light source information.

2. The method of claim 1, wherein the light source information of the at least one glare source corresponding to the line of pixels is acquired according to a correspondence between the line of pixels and the at least one glare source.

3. The method of claim 1, further comprising:
    predetermining the at least one glare source corresponding to the line of pixels.

4. The method of claim 3, wherein the predetermining the at least one glare source corresponding to the line of pixels comprises:
turning on the at least one light source; and
determining the at least one glare source corresponding to the line of pixels according to whether the line of pixels has the glare.

5. The method of claim 3, wherein the predetermining the at least one glare source corresponding to the line of pixels comprises:
turning on the at least one light source in groups; and
determining at least one group of the at least one light source as the at least one glare source corresponding to the line of pixels according to whether the line of pixels has the glare.

6. The method of claim 4, wherein, a brightness value of the glaring pixel is greater than a predetermined brightness value.

7. The method of claim 6, wherein, the glaring pixel has a predetermined number of adjacent pixels having brightness values that are greater than the predetermined brightness value.

8. The method of claim 1, further comprising:
turning on another light source in the at least one light source except for the at least one glare source.

9. The method of claim 1, wherein the imaging apparatus is an electronic rolling shutter-type imaging apparatus.

10. The method of claim 9, wherein the at least one light source is at least two light sources, and the at least two light sources are distributed along a rolling direction of the electronic rolling shutter-type imaging apparatus.

11. An apparatus, comprising:
a memory that stores executable modules; and
a processor, coupled to the memory, that executes or facilitates execution of the executable modules, comprising:
a predetermining module configured to, in response to a determination that a proportion of glaring pixels in a line of pixels is greater than a threshold, determine that the line of pixels has a glare;
an acquiring module configured to: in response to a determination that an imaging apparatus is ready for reading data of the line of pixels, receive light source information of at least one glare source corresponding to the line of pixels, the at least one glare source being at least one light source of a set of light sources of the imaging apparatus, causing the glare of the line of pixels when being in an ON state; and
an executing module configured to turn off the at least one light source in the ON state in the at least one glare source according to the light source information.

12. The apparatus of claim 11, wherein the acquiring module receives the light source information of the at least one glare source corresponding to the line of pixels according to a correspondence between the line of pixels and the at least one glare source.

13. The apparatus of claim 11, wherein:
the predetermining module is further configured to predetermine the at least one glare source corresponding to the line of pixels.

14. The apparatus of claim 13, wherein the predetermining module is configured to turn on the at least one light source, and determine the at least one glare source corresponding to the line of pixels according to whether the line of pixels has the glare.

15. The apparatus of claim 13, wherein the predetermining module is configured to turn on the at least one light source in groups, and determine at least one group of the light source as the at least one glare source corresponding to the line of pixels according to whether the line of pixels has the glare.

16. The apparatus of claim 11, wherein the executing module is further configured to turn on a light source of the set of light sources other than the at least one glare source.

17. The apparatus of claim 11, wherein the imaging apparatus is an electronic rolling shutter-type imaging apparatus.

18. The apparatus of claim 17, wherein the at least one light source is at least two light sources, and the at least two light sources are distributed along a rolling direction of the electronic rolling shutter-type imaging apparatus.

19. A non-transitory computer readable medium, comprising at least one executable instruction, which, in response to execution, causes an apparatus comprising a processor to perform operations, comprising:
in response to determining that a proportion of glaring pixels in a line of pixels is greater than a threshold, determining that the line of pixels has a glare;
in response to determining that an imaging device is ready for reading data of the line of pixels, acquiring light source information of at least one glare source corresponding to the line of pixels, the at least one glare source being at least one of a group of light sources of the imaging apparatus, causing the glare of the line of pixels when being in an ON state; and
turning off the at least one of the group of light sources in the ON state in the at least one glare source according to the light source information.

20. An apparatus, characterized by comprising a processor and a memory, the memory storing executable instructions, the processor being connected to the memory via a communication bus, and when the imaging control apparatus operates, the processor executing or facilitating the executing of the executable instructions stored in the memory, so that the imaging control apparatus executes operations, comprising:
in response to determining that a proportion of glaring pixels in a line of pixels is greater than a threshold, determining that the line of pixels has a glare;
in response to determining that an imaging device is ready for reading data of the line of pixels, receiving light source information of a glare source corresponding to the line of pixels, the glare source being a light source of the imaging apparatus causing the glare of the line of pixels when being in an ON state; and
turning off the light source in the ON state in the glare source according to the light source information.

21. The apparatus of claim 20, wherein the light source information of the at least one glare source corresponding to the line of pixels is acquired according to a correspondence between the line of pixels and the at least one glare source.

22. The apparatus of claim 20, the operations further comprising:
predetermining the at least one glare source corresponding to the line of pixels.

* * * * *